US009772958B2

(12) United States Patent
Mogul et al.

(10) Patent No.: US 9,772,958 B2
(45) Date of Patent: Sep. 26, 2017

(54) METHODS AND APPARATUS TO CONTROL GENERATION OF MEMORY ACCESS REQUESTS

(75) Inventors: Jeffrey Clifford Mogul, Menlo Park, CA (US); Jayaram Mudigonda, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 442 days.

(21) Appl. No.: 13/285,973

(22) Filed: Oct. 31, 2011

(65) Prior Publication Data

US 2013/0111175 A1 May 2, 2013

(51) Int. Cl.
*H04L 12/801* (2013.01)
*G06F 13/16* (2006.01)

(52) U.S. Cl.
CPC ................... *G06F 13/1642* (2013.01)

(58) Field of Classification Search
None
See application file for complete search history.

(56) References Cited

U.S. PATENT DOCUMENTS

| | | | | |
|---|---|---|---|---|
| 5,617,537 | A * | 4/1997 | Yamada et al. | 709/214 |
| 6,421,730 | B1 * | 7/2002 | Narad et al. | 709/236 |
| 6,574,368 | B1 * | 6/2003 | Boon et al. | 382/232 |
| 7,230,917 | B1 * | 6/2007 | Fedorkow et al. | 370/229 |
| 7,256,719 | B2 * | 8/2007 | Mitchell et al. | 341/67 |
| 7,403,542 | B1 * | 7/2008 | Thompson | 370/474 |
| 7,853,951 | B2 * | 12/2010 | Rosenbluth et al. | 718/104 |
| 2002/0009081 | A1 * | 1/2002 | Sampath | H04L 12/462 370/389 |
| 2002/0075857 | A1 * | 6/2002 | LeBlanc | 370/352 |
| 2003/0231593 | A1 * | 12/2003 | Bauman et al. | 370/235 |
| 2004/0071086 | A1 * | 4/2004 | Haumont | H04L 12/5602 370/230 |
| 2004/0148423 | A1 * | 7/2004 | Key | H04L 47/10 709/235 |
| 2004/0257995 | A1 * | 12/2004 | Sandy et al. | 370/235 |
| 2005/0078660 | A1 * | 4/2005 | Wood | H04L 12/5692 370/352 |
| 2005/0138459 | A1 * | 6/2005 | Yoon et al. | 713/600 |
| 2006/0221832 | A1 * | 10/2006 | Muller et al. | 370/235 |
| 2007/0286279 | A1 * | 12/2007 | Hamanaka | 375/240.12 |

(Continued)

OTHER PUBLICATIONS

Ebrahimi et al., "Fairness via Source Throttling: A Configurable and High-Performance Fairness Substrate for Multi-Core Memory Systems," ASPLOS'10, Mar. 13-17, 2010, 12 pages.

(Continued)

*Primary Examiner* — Henry Tsai
*Assistant Examiner* — Christopher Bartels
(74) *Attorney, Agent, or Firm* — Hanley Flight & Zimmerman, LLC

(57) ABSTRACT

Example methods, apparatus, and articles of manufacture to control generation of memory access requests in processor systems are disclosed. A disclosed example method involves determining at a memory controller whether a memory access queue depth for a memory reference is greater than a first threshold. When the memory access queue depth for the memory reference is greater than the first threshold, an indication is sent to control generation of memory access requests corresponding to the memory reference.

17 Claims, 8 Drawing Sheets

(56) References Cited

U.S. PATENT DOCUMENTS

| | | | |
|---|---|---|---|
| 2010/0153617 A1* | 6/2010 | Miroshnichenko et al. | 711/6 |
| 2010/0165846 A1* | 7/2010 | Yamaguchi et al. | 370/236 |
| 2010/0191525 A1* | 7/2010 | Rabenko et al. | 704/211 |
| 2011/0128765 A1* | 6/2011 | MacWilliams | G06F 12/0646 365/52 |
| 2011/0153950 A1* | 6/2011 | Ishizaka et al. | 711/133 |
| 2011/0191650 A1* | 8/2011 | Yokokawa | 714/752 |
| 2012/0020210 A1* | 1/2012 | Sonnier | H04L 47/621 370/230.1 |

OTHER PUBLICATIONS

Kim et al., "ATLAS: A Scalable and High-Performance Scheduling Algorithm for Multiple Memory Controllers," Carnegie Mellon University, 12 pages, Journal: IEEE; Date: Serial 987-1-4244-5659-8/09.

* cited by examiner

PROCESSOR (CPU)

PROCESSOR (CPU)

METHODS AND APPARATUS TO CONTROL GENERATION OF MEMORY ACCESS REQUESTS

BACKGROUND

In processor systems, a processor or central processing unit (CPU) accesses memory through a memory controller. When the CPU executes a multi-thread environment, multiple threads can simultaneously generate memory access requests to access memory contents. Each memory access request is sent by the CPU to the memory controller so that the memory controller can translate the requests into physical memory locations and grant access to such physical memory locations. In multi-core processor systems, simultaneous use of multiple CPU cores can multiply the number of simultaneous memory requests in the system. In some instances, processor systems are provided with multiple memory controllers to handle accesses to respective memory devices. In any of these types of processor systems, the quantity of memory access requests generated by threads can be overwhelming for the memory controller(s) and the physical memory that they control and may, in some instances, create memory access congestion at the memory controller(s).

DETAILED DESCRIPTION

Figure 1:
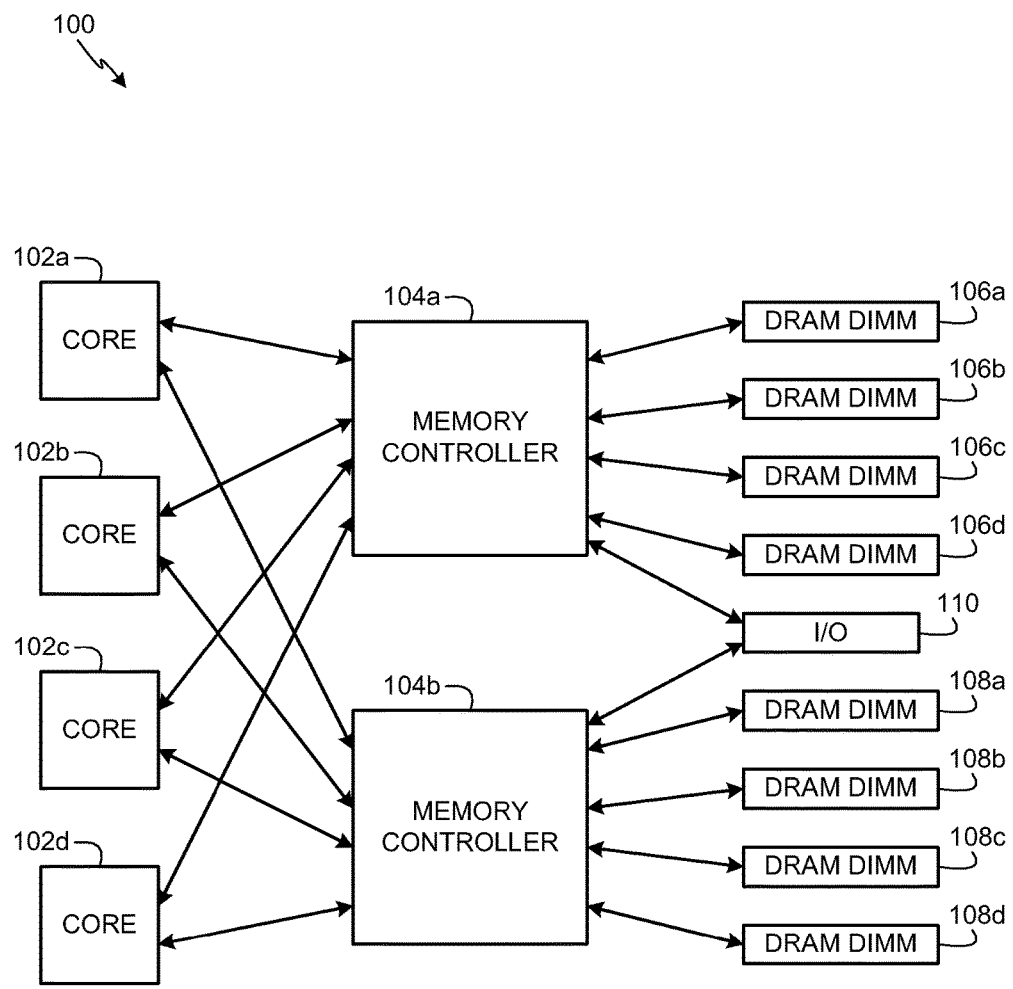
FIG. 1 illustrates an example multi-core processor system constructed in accordance with the teachings of this disclosure to control generation of memory access requests.

Example methods, apparatus, and articles of manufacture are disclosed herein to control generation of memory access requests in processor systems. Examples disclosed herein may be implemented in multi-core processor systems and/or single-core processor systems. A multi-core processor system has two or more central processing units (CPUs) and one or more memory controllers. A single-core processor system has one CPU and typically one memory controller. Examples disclosed herein provide techniques to arbitrate memory resource usage between multiple threads running in a multi-core or single-core processor system. Memory resource usage is arbitrated between threads in a manner that reduces (e.g., eliminates or substantially eliminates) one or more threads from unfairly or unevenly achieving higher memory access service rates relative to other threads.

In some examples disclosed herein, a memory controller uses probabilities (e.g., random probabilities or pseudo-random probabilities) and its current memory access request queue depth to generate increase-decrease feedback for use by CPU core(s) to control memory access request rate(s). In some examples, the increase-decrease feedback may be single-bit feedback or feedback in which two states (e.g., increase memory access requests and decrease memory access requests) are indicatable. The current queue depth of the memory controller is indicative of whether the memory controller is experiencing congestion from one or more particular threads. In some such examples, the memory controller employs the probability to allocate memory access resource usage to the particular thread in a manner that also enables evenly or substantially evenly distributing memory access resources of the memory controller(s) among other threads. In such examples, the memory controller sends the feedback to CPU core(s) running the particular thread(s) to control the memory access request rate of the thread(s). In such examples, the CPU core(s) throttle(s) the memory-request load (e.g., memory access request rate or memory access request quota) of the particular thread(s) based on the rate at which such feedback signals are received. In such examples, an operating system (OS) running on the CPU core(s) selects values of parameters to adjust thread priorities and system performance and/or throughput.

In some examples disclosed herein, a memory controller uses its memory access request queue depth to generate congestion-descriptive feedback for use by CPU core(s) to control memory access request rate(s). Unlike the increase-decrease feedback noted above, congestion-descriptive feedback indicates a level of congestion. That is, the memory controller generates the congestion-descriptive feedback to describe or quantify an amount of congestion experienced by the memory controller for a particular thread or threads. In some such examples, CPUs are configured to throttle memory access request rates of threads based on congestion-descriptive feedback received from the memory controller(s) for those threads. In such examples, the CPUs perform the memory access request rate throttling in a manner that also enables evenly distributing memory access resources of the memory controller(s) among other threads. In some such examples, an OS running on the CPU core(s) selects values of parameters to adjust thread priorities and system performance and/or throughput.

An example advantage of the techniques disclosed herein is that memory controllers need not coordinate or communicate between one another to address memory access request congestion. Instead, each memory controller in a multi-memory controller processor system need only send its feedback to one or more CPU(s) to cause those CPU(s) to decrease or increase generation of memory access requests by their thread(s). In this manner, by not needing to configure inter-memory controller communications, example techniques disclosed herein enable increased scalability for increasing memory capacities in processor systems.

Some disclosed example methods, apparatus, and/or articles of manufacture to control generation of memory access requests involve determining whether a memory access queue depth at a memory controller for a memory reference is greater than a first threshold. When the memory access queue depth for the memory reference is greater than the first threshold, an indication is sent to a processor to control generation of memory access requests corresponding to the memory reference. In some examples, the indication is a single-bit value determined by determining a ratio based on the first threshold, a second threshold, and the queue depth, and by comparing the ratio to a number (e.g., a random number, a pseudo-random number, a predefined number, etc.). In some such examples, the single-bit value is indicative of an allowance to increase a quantity of memory access requests for the memory reference when the ratio is greater than the random number, and the single-bit value is indicative of a request to decrease the quantity of memory access requests for the memory reference when the ratio is not greater than the random number.

In some examples, the indication is a multi-bit value indicative of an amount of memory access request congestion at the memory controller for the memory reference. In some such examples, the multi-bit value is generated by determining a ratio based on the first threshold, a second threshold, and the queue depth, and then bit-encoding the ratio. In some examples, two or more memory access queue depths are tracked at the memory controller for respective memory references of two or more processors, and a second indication is sent to a second processor to control generation of memory access requests corresponding to a second memory reference.

Some disclosed example methods, apparatus, and/or articles of manufacture to control generation of memory access requests involve a register in a processor to store a value to control memory access requests to be generated by a thread for sending to a memory controller, and an enforcer to control generation of the memory access requests based on the value stored in the register. In some examples, the enforcer controls the generation of the memory access requests by controlling access to one or more miss status holding registers (MSHRs) in the processor. In some examples, a second register in the processor is to store a second value to control second memory access requests to be generated by a second thread for sending to a second memory controller, and the enforcer is to control generation of the second memory access requests based on the second value stored in the second register.

In some examples, the value is a quota value indicative of a quantity of pending memory access requests that can be maintained by the processor for the thread. In some examples, a quota determiner is used to generate the quota value based on a feedback signal from the memory controller and a current quota value. In such examples, the feedback signal is indicative of an allowance to increase the quota value or a request to decrease the quota value.

In some examples, the value is a rate value indicative of a rate at which the thread is allowed to generate memory access requests. In some examples, a rate determiner is to generate the rate value based on a feedback signal from the memory controller and a current rate value. In some examples, the feedback signal is indicative of an amount of memory access request congestion at the memory controller for the thread.

FIG. 1 illustrates an example multi-core processor system 100 useable to implement the teachings disclosed herein to control generation of memory access requests. The multi-core processor system 100 of the illustrated examples includes four cores (e.g., CPUs) 102a-d and two memory controllers 104a-b. However, disclosed examples may be implemented in connection with any number of cores (e.g., CPUs) and/or memory controllers. In the illustrated example, the memory controller 104a is in communication with four memory devices 106a-d, and the memory controller 104b is in communication with four memory devices 108a-d. The memory devices 106a-d and 108a-d are shown in the illustrated example as dynamic random access memory (DRAM) dual inline memory modules (DIMMs). However, disclosed examples may be implemented in connection with other type(s) and/or number(s) of memories. In the illustrated example, the memory controllers 104a-b are also in communication with an input/output (I/O) interface 110 to communicatively interface with external memory devices. In some examples, the memory devices 106a-d and 108a-d implement main memory. In other examples, the memory devices 106a-d and 108a-d implement volatile, intermediate memory that temporarily store(s) data from long-term mass memory such as magnetic, solid state, and/or optical disk drives. In some examples, such a storing arrangement is used when data access speeds of the memory devices 106a-d and 108a-d are relatively faster than data access speeds of the long-term mass memory.

In the illustrated example of FIG. 1, the CPUs 102a-d can access information (e.g., read and/or write information) in the memory devices 106a-d and 108a-d and/or in an external memory communicatively coupled to the I/O interface 110 by sending memory access requests to the memory controllers 104a-b. For example, to access information in any of the memory devices 106a-d, one or more of the CPUs 102a-d send(s) one or more memory access request(s) to the memory controller 104a, and to access information in any of the memory devices 108a-d, one or more of the CPUs 102a-d send(s) one or more memory access request(s) to the memory controller 104b. To access information via the I/O interface 110 from an external memory device having memory address(es) in a memory map managed by the memory controller 104a, one or more of the CPUs 102a-d send(s) one or more memory access request(s) to the memory controller 104a. To access information via the I/O interface 110 from an external memory device having memory address(es) in a memory map managed by the memory controller 104b, one or more of the CPUs 102a-d send(s) one or more memory access request(s) to the memory controller 104b.

Figure 2:
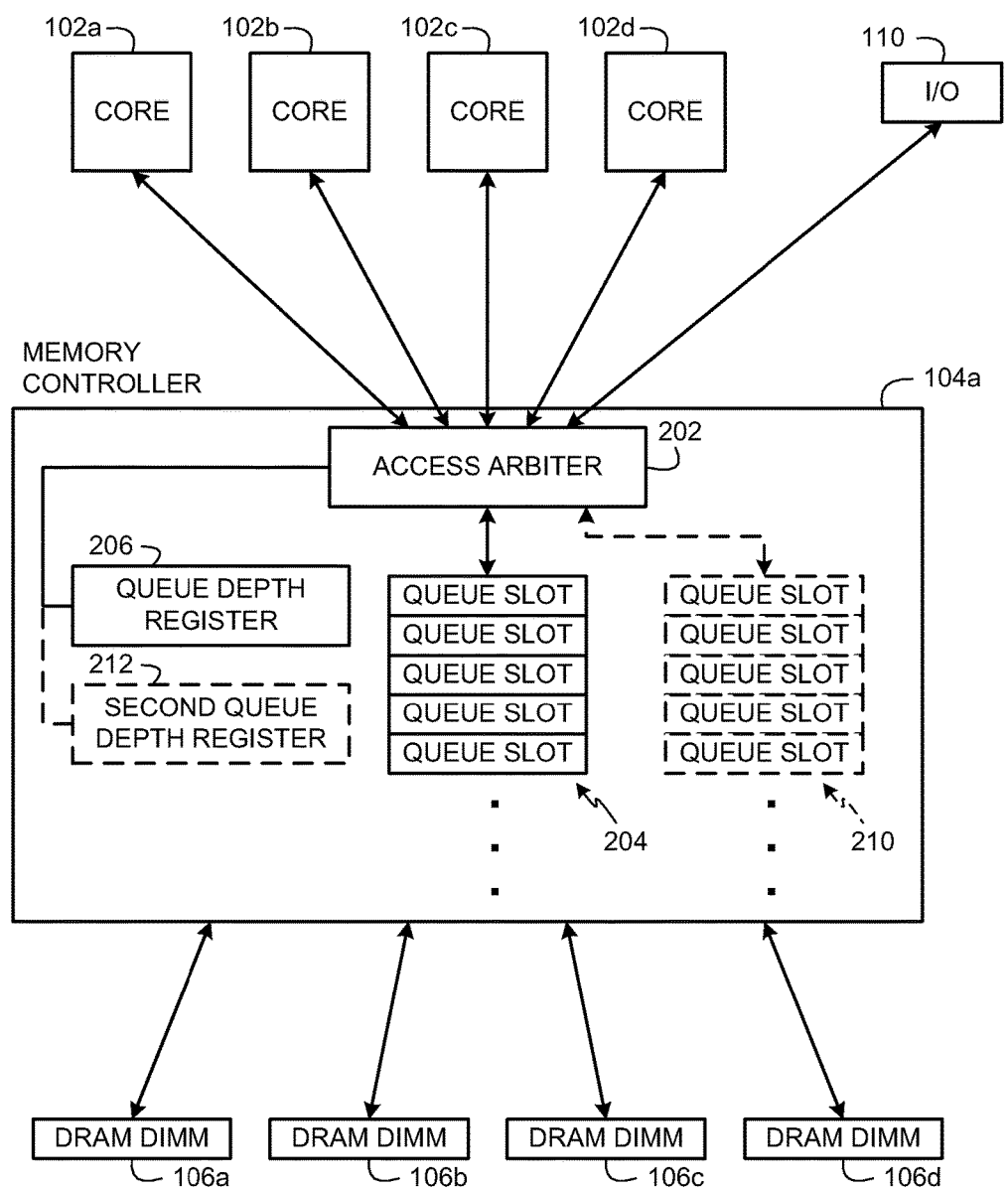
FIG. 2 illustrates either and/or both of the memory controllers of FIG. 1 constructed in accordance with the teachings of this disclosure to control generation of memory access requests.

FIG. 2 illustrates the memory controller 104a of FIG. 1 in communication with the cores (e.g., CPUs) 102a-d, the memory devices 106a-d, and the I/O interface 110. Although only the memory controller 104a is shown in detail, the memory controller 104b may be substantially similar or identical to the memory controller 104a. In the illustrated example, the memory controller 104a includes an example access arbiter 202, a memory access queue 204, and a queue depth register 206. In the illustrated example, the access arbiter 202 receives memory access requests from the CPUs 102a-d and arbitrates access to the memory devices 106a-d and/or the I/O interface 110 by queuing access requests in queues such as the memory access queue 204. In addition, the access arbiter 202 sends requested information to the CPUs 102a-d after retrieval of the same from one or more of the memory devices 106a-d and/or the I/O interface 110.

In the illustrated example, the access arbiter 202 also generates and/or sends feedback to one or more of the CPUs 102a-d for corresponding memory references (e.g., memory references of threads executed by the CPUs 102a-d). The memory controller 104a of the illustrated example generates such feedback to cause respective one(s) of the CPUs 102a-d to control generation of memory access requests associated with threads executed thereby. In some examples, such controlling of generation of memory access requests involves increasing or decreasing the quantity of memory access requests that can be pending at any given time for a particular thread. In some examples, the feedback is a single-bit value that may be used to indicate an allowance to increase a quantity of memory access requests pending for a thread or to indicate a request to decrease the quantity of memory access requests pending for the thread. In other examples, controlling of generation of memory access requests involves increasing or decreasing the rate at which a thread is allowed to generate memory access requests. In such other examples, the feedback is a multi-bit value indicative of an amount of memory access request congestion in the queue 204 at the memory controller 104a for the thread.

In the illustrated example, the memory controller 104a uses the memory access queue 204 and the queue depth register 206 to track memory access requests for a corresponding thread executed by one of the CPUs 102a-d. The memory controller 104a associates the memory access queue 204 and the queue depth register 206 with a corresponding thread based on a memory reference used by that thread to request memory access (e.g., read and/or write information). When the memory controller 104a receives a memory access request having a memory reference corresponding to the memory access queue 204, the access arbiter 202 places the memory access request in a queue slot of the queue 204. In addition, the queue depth register 206 increments a queue count for the newly added memory access request. When the memory controller 104a finishes servicing a memory access request in the memory access queue 204, the memory access request is removed from the queue 204, and the queue depth register 206 decrements its queue count. In this manner, the queue depth register 206 tracks the quantity of memory access requests pending in the memory access queue 204.

In the illustrated example, to determine an amount or level of congestion in the memory access queue 204, the access arbiter 202 uses Equation 1 below to determine a congestion ratio (F) based on a lower threshold (T1), higher threshold (T2), and a queue depth (D) of the memory access queue 204.

$$F=(D-T1)/(T2-T1) \quad \text{Equation 1}$$

In Equation 1 above, the access arbiter 202 divides the difference between the queue depth (D) and the lower threshold (T1) by the difference between the higher threshold (T2) and the lower threshold (T1) to determine the congestion ratio (F). In the illustrated example, the thresholds (T1 and T2) are selected by an operating system (OS) executing on one or more of the CPUs 102a-d based on, for example, a desired performance, a desired memory access throughput, and/or a desired memory resource usage. For example, the lower threshold (T1) may be selected to be a queue depth deemed to not be congested, and the higher threshold (T2) may be selected to be a queue depth deemed to be congested. In the illustrated example, the thresholds (T1) and (T2) are configured so that they are modifiable by the OS but protected from being modified by other entities (e.g., hardware, applications, processes, and/or threads).

To arbitrate memory access requests for multiple threads executed by one or more of the CPUs 102a-d, the memory controller 104a may be provided with multiple memory access queues and corresponding queue depth registers. For example, to track memory access requests for a second thread of one of the CPUs 102a-d, the memory controller 104a may be provided with a second memory access queue 210 and a second queue depth register 212.

In the illustrated example of FIG. 2, while an example manner of implementing the memory controller 104a has been illustrated, one or more of the elements, processes and/or devices illustrated in FIG. 2 may be combined, divided, re-arranged, omitted, eliminated and/or implemented in any other way. Further, the access arbiter 202, the queue depth register 206, the memory access queue 204, the second queue depth register 212, and/or the second memory access queue 210 may be implemented by hardware, software, firmware and/or any combination of hardware, software and/or firmware. Thus, for example, any of the access arbiter 202, the queue depth register 206, the memory access queue 204, the second queue depth register 212, and the second memory access queue 210, and/or, more generally, the example memory controller 104a could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus and/or system claims are read to cover a purely software and/or firmware implementation, at least one of the access arbiter 202, the queue depth register 206, the memory access queue 204, the second queue depth register 212, and/or the second memory access queue 210 is hereby expressly defined to include a tangible computer readable medium such as a memory, DVD, CD, etc. storing the software and/or firmware. Further still, the example memory controller 104a illustrated in FIG. 2 may include one or more elements, processes and/or devices in addition to, or instead of, those illustrated in FIG. 2, and/or may include more than one of any or all of the illustrated elements, processes and devices.

Figure 3:
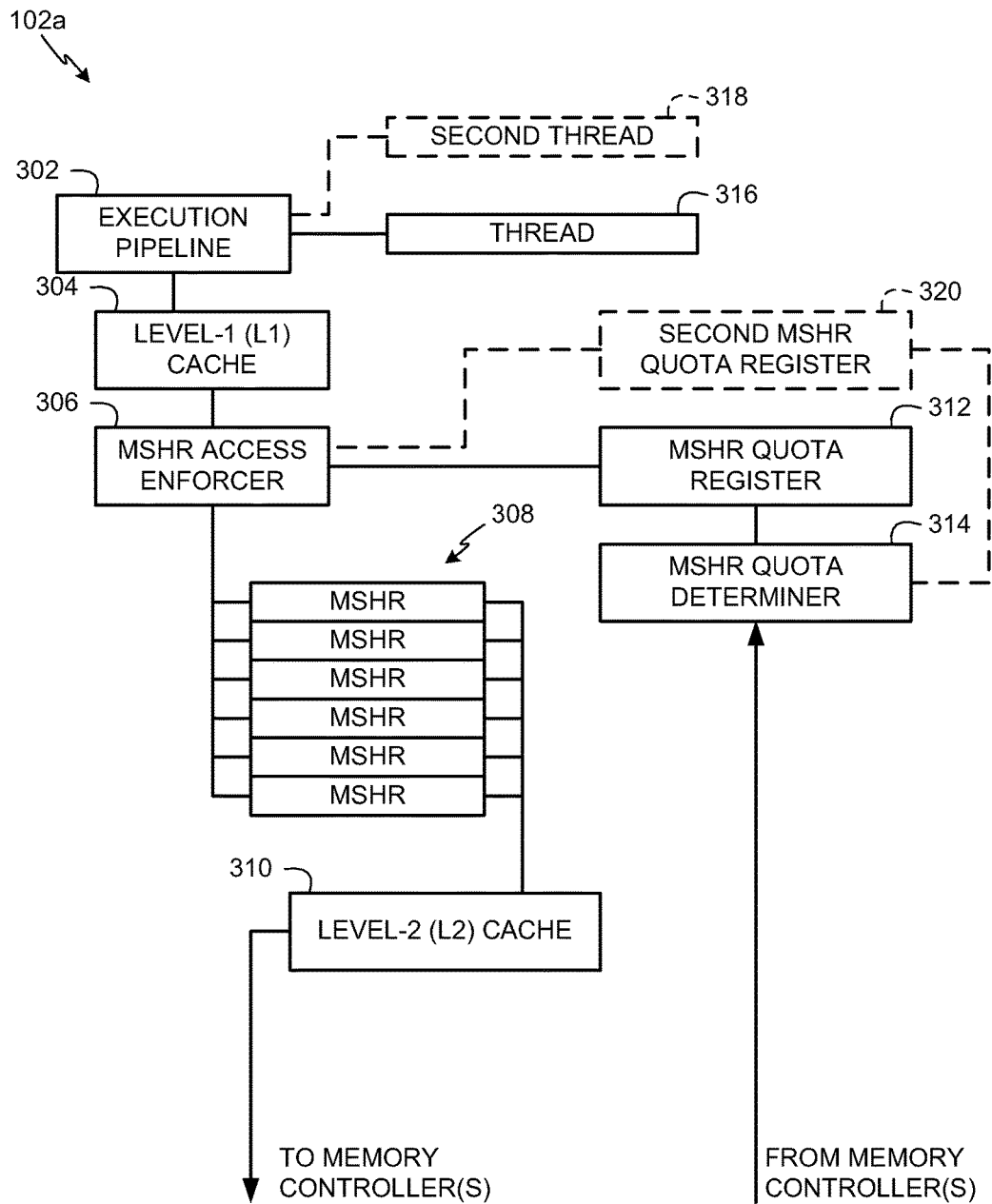
FIG. 3 illustrates an example processor to control generation of memory access requests based on feedback messages from one or more memory controllers indicating whether to increase or decrease a quantity of memory access requests.

FIG. 3 illustrates the example core (e.g., CPU) 102a of FIGS. 1 and 2 useable to control generation of memory access requests based on feedback messages from one or more memory controllers (e.g., one or both of the memory controllers 104a-b of FIG. 1) indicating whether to increase or decrease a quantity of memory access requests. For purposes of discussion, the core 102a is shown in FIG. 3. However, although only the CPU 102a is shown in detail in FIG. 3, each of the CPUs 102b-d (FIGS. 1 and 2) may be substantially similar or identical to the CPU 102a. In the illustrated example, the CPU 102a includes an execution pipeline 302, a level-1 (L1) cache 304, a miss status holding register (MSHR) access enforcer 306, an MSHR queue 308, a level-2 (L2) cache 310, a MSHR quota register 312, and a MSHR quota determiner 314.

In the illustrated example, the execution pipeline 302 executes instructions and memory access requests corresponding to a thread 316. In the illustrated example, the thread 316 is assigned a memory reference for use in making memory access requests. That is, when the CPU 102a sends memory access requests to the memory controller(s) 104a, 104b for the thread 316, the CPU 102a sends the memory reference of the thread 316 with the memory access request to the memory controller(s) 104a, 104b. In this manner, the memory controller(s) 104a, 104b can identify the CPU (e.g., the CPU 102a) to which it should send a response with the requested memory contents.

In the illustrated example, the level-1 cache 304 is the primary cache used by the CPU 102a to cache frequently accessed data and/or microinstructions. The level-1 cache 304 is the fastest cache in the cache hierarchy and may be capable of running at the same speed as the CPU 102a. The level-1 cache 304 may be on the same chip as the core 102a. If data or an instruction requested by the thread 316 is stored in the level-1 cache 304, the execution pipeline 302 retrieves the requested data or instruction relatively quickly from the level-1 cache 304. When the data or instruction is not found in the level-1 cache 304 (e.g., defined as a cache miss), the CPU 102a queues a request for the data or instructions in the MSHR queue 308. When the CPU 102a services the request in the MSHR queue 308, the CPU 102a checks the level-2 cache 310 for the requested data or instruction. The level-2 cache 310 stores data or instructions not cached in the level-1 cache 304 (e.g., because the data or instructions in the level-2 cache 310 are accessed less frequently than data or instructions in the level-1 cache 304). If the level-2 cache 310 stores the requested data or instruction, the CPU 102a provides the data or instruction to the execution pipeline 302 from the level-2 cache 310. Otherwise, if the requested data or instruction is not found in the level-2 cache 310 (e.g., a level-2 cache miss occurs), the CPU 102a sends a memory access request along with a memory reference of the thread 316 to a memory controller (e.g., one of the memory controllers 104a-b of FIGS. 1 and 2) so that the data may be retrieved from, for example, external memory (e.g., the memory devices 106a-d or 108a-d). Although the core 102a of the illustrated example of FIG. 3 is shown in connection with the MSHR queue 308 being located between the level-1 (L1) cache 304 and the level-2 (L2) cache 310, examples disclosed herein may additionally or alternatively be implemented in connection with MSHR queues located after the level-2 (L2) cache 310 and/or in connection with separate MSHR queues located at multiple locations relative to the L1 and L2 caches (e.g., an MSHR queue located between the L1 and L2 caches 304 and 310 and after an MSHR queue located after the L2 cache 310).

In the illustrated example of FIG. 3, when the MSHR queue 308 is full and a cache miss occurs in the level-1 cache 304, the thread 316 is stalled (i.e., prevented from completing execution of a current instruction and/or from advancing to a next instruction) until an MSHR entry in the MSHR queue 308 is open to receive another request. The thread 316 is allowed to continue processing when the requested data or instruction is retrieved from the level-2 cache 310 or retrieved from one of the memory devices 106a-d or 108a-d.

In some instances, the quantity of memory access requests generated by the thread 316 and pending in the MHSR queue 308 may cause congestion at the memory controller(s) 104a-b. To prevent, reduce, and/or eliminate the congestion caused by the thread 316, the CPU 102a of the illustrated example is provided with the MSHR access enforcer 306, the MSHR quota determiner 314, and the MSHR quota register 312. The MSHR quota determiner 314 of the illustrated example is to receive memory controller feedback (MCF) from the memory controller(s) 104a-b related to the quantity of memory requests that are allowed to be generated by the thread 316 in order to prevent, reduce, and/or eliminate memory access request congestion at one or more of the memory controllers 104a-b. When the thread 316 is not causing memory access request congestion at the memory controller(s) 104a-b, the memory controller feedback (MCF) may be used to increase the quantity of memory access requests by the thread 316 that can be pending at any give time, thus improving performance of the thread 316 and/or the CPU 102a.

In the illustrated example, the memory controller(s) 104a-b send(s) the memory controller feedback (MCF) in association with a memory reference (e.g., a memory reference identifier) used by the thread 316 to generate memory access requests. In some examples, the memory controller feedback received by the MSHR quota determiner 314 from the memory controller(s) 104a-b is in the form of one-bit feedback indicative of whether a quantity of memory access requests that are pending at any given time for the thread 316 should be decreased or increased.

In the illustrated example, the quantity of memory access requests that can be pending at any given time is referred to as an MSHR quota (Q). The MSHR quota (Q) is representative of the quantity of MSHR slots in the MSHR queue 308 that can be used by the thread 316. Defining the quantity of MSHR slots in the MSHR queue 308 that can be used for memory access requests from a thread (e.g., the thread 316) defines the quantity of memory access requests that can be pending at any given time for the thread (e.g., the thread 316). In the illustrated example, the MSHR quota determiner 314 determines the MSHR quota (Q) using Equation 2 below if the memory controller feedback (MCF) is indicative of an allowance to increase the quantity of pending memory access requests. If the memory controller feedback (MCF) is indicative of a request to decrease the quantity of pending memory access requests, the MSHR quota determiner 314 uses Equation 3 below to determine the MSHR quota (Q).

If MCF=increase, then $Q_N=Q_C+(1/Q_C)$  Equation 2

If MCF=decrease, then $Q_N=Q_C/2$  Equation 3

In Equation 2 above, if the memory controller feedback (MCF) is indicative of an allowance to increase the quantity of pending memory access requests for the thread 316, then a new MSHR quota ($Q_N$) is determined by adding a current MSHR quota ($Q_C$) to the inverse of the current MSHR quota ($1/Q_C$) (i.e., $Q_N=Q_C+(1/Q_C)$). In Equation 3 above, if the memory controller feedback (MCF) is indicative of a request to decrease the quantity of pending memory access requests for the thread 316, then a new MSHR quota ($Q_N$) is determined by dividing the current MSHR quota ($Q_C$) by two (2) (i.e., $Q_N=Q_C/2$). Although Equation 2 defines increasing the current MSHR quota ($Q_C$) for determining the new MSHR quota ($Q_N$) based on the inverse of the current MSHR quota ($1/Q_C$), the value by which to increase the current MSHR quota ($Q_C$) for determining the new MSHR quota ($Q_N$) may be selected by, for example, the OS to be a value other than the inverse of the current MSHR quota ($1/Q_C$). In some examples, the new MSHR quota ($Q_N$) may be increased by adding the current MSHR quota ($Q_C$) to any other OS-selected value, by multiplying the current MSHR quota ($Q_C$) by any other OS-selected value, and/or using any other increase, arithmetic or logic operation. In addition, although Equation 3 defines decreasing the current MSHR quota ($Q_C$) for determining the new MSHR quota ($Q_N$)

based on dividing the current MSHR quota ($Q_C$) by two (2) (i.e., $Q_N=Q_C/2$), the value by which to decrease the current MSHR quota ($Q_C$) for determining the new MSHR quota ($Q_N$) may be selected by, for example, the OS to be a value other than two (2) (e.g., dividing the current MSHR quota ($Q_C$) by another value, subtracting another value from the current MSHR quota ($Q_C$), or using any other decrease, arithmetic or logic operation to determine the new MSHR quota ($Q_N$) by decreasing the current MSHR quota ($Q_C$)).

After the MSHR quota determiner 314 determines the new MSHR quota ($Q_N$), the MSHR quota determiner 314 of the illustrated example stores the new MSHR quota ($Q_N$) value in the MSHR quota register 312. The MSHR access enforcer 306 of the illustrated example limits the thread 316 to using a quantity of the MSHR slots in the MSHR queue 308 that is equal to the MSHR quota (Q) value stored in the MSHR quota register 312. In some examples, this may allow the corresponding thread (e.g., the thread 316) to increase a quantity of memory access requests pending at any given time if the current MSHR quota (Q) value stored in the MSHR quota register 312 is greater than the MSHR quota (Q) value previously stored in the MSHR quota register 312. For instances in which the MSHR quota (Q) value currently stored in the MSHR quota register 312 is less than the MSHR quota (Q) value previously stored in the MSHR quota register 312, the corresponding thread (e.g., the thread 316) is caused to limit the quantity of memory access requests pending to be less than or equal to the MSHR quota (Q) value currently stored in the MSHR quota register 312. That is, if the quantity of pending memory access requests is less than the MSHR quota (Q) value currently stored in the MSHR quota register 312, new memory access requests will be queued so long as the quantity of pending memory access requests is less than the MSHR quota (Q) value currently stored in the MSHR quota register 312. After decreasing the currently stored MSHR quota (Q) value, if the quantity of pending memory access requests is greater than or equal to the MSHR quota (Q) value currently stored in the MSHR quota register 312, new memory access requests will not be queued until the quantity of pending memory access requests is less than the MSHR quota (Q) value currently stored in the MSHR quota register 312.

In some examples, the CPU 102a may execute a second thread 318 or more threads. In such examples, the CPU 102a is provided with a second MSHR quota register 320 to store a MSHR quota (Q) value corresponding to the second thread 318, although the second MSHR quota register 320 can store MSHR quota (Q) values for a third thread, etc. In this manner, the MSHR access enforcer 306 can limit each thread (e.g., the thread 318) to using a quantity of the MSHR slots in the MSHR queue 308 that is equal to the MSHR quota (Q) value stored in the MSHR quota register 320. If the CPU 102a executes more than two threads simultaneously, the CPU 102a can be provided with a corresponding MSHR quota register (that is similar or identical to the MSHR quota registers 312 and 320) for each additional thread.

In the illustrated example, to identify which MSHR quota register corresponds to which thread, each of the MSHR quota registers (e.g., the MSHR quota registers 312 and 320) is associated with a respective memory reference that is used by its respective thread (e.g., the threads 316 and 318) to generate memory access requests. In some examples, the MSHR quota registers (e.g., the MSHR quota registers 312 and 320) may additionally or alternatively be associated with a respective thread identifier (ID) of its respective thread (e.g., the threads 316 and 318).

In the illustrated example of FIG. 3, the MSHR quota register 312 and the second MSHR quota register 320 are configured so that they are not modifiable by their respective threads, but are instead only modifiable by the OS. In the illustrated example, when different software threads are multiplexed over a hardware thread (e.g., when different software threads are instantiated or started and others are ended), the OS stores the MSHR quota (Q) value(s) in the MSHR quota register 312 and/or the second MSHR quota register 320 to memory (e.g., an SRAM buffer embedded in the core 102a) and stores MSHR quota (Q) value(s) corresponding to the recently instantiated or started threads in the MSHR quota register 312 and/or the second MSHR quota register 320.

In the illustrated example of FIG. 3, while an example manner of implementing the CPU 102a has been illustrated, one or more of the elements, processes and/or devices illustrated in FIG. 3 may be combined, divided, re-arranged, omitted, eliminated and/or implemented in any other way. Further, the MSHR access enforcer 306, the MSHR quota register 312, the MSHR quota determiner 314, and/or the second MSHR quota register 320 may be implemented by hardware, software, firmware and/or any combination of hardware, software and/or firmware. Thus, for example, any of the MSHR access enforcer 306, the MSHR quota register 312, the MSHR quota determiner 314, and the second MSHR quota register 320, and/or, more generally, the example CPU 102a could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus and/or system claims are read to cover a purely software and/or firmware implementation, at least one of the MSHR access enforcer 306, the MSHR quota register 312, the MSHR quota determiner 314, and/or the second MSHR quota register 320 is hereby expressly defined to include a tangible computer readable medium such as a memory, DVD, CD, etc. storing the software and/or firmware. Further still, the example CPU 102a illustrated in FIG. 3 may include one or more elements, processes and/or devices in addition to, or instead of, those illustrated in FIG. 3, and/or may include more than one of any or all of the illustrated elements, processes and devices.

Figure 4:
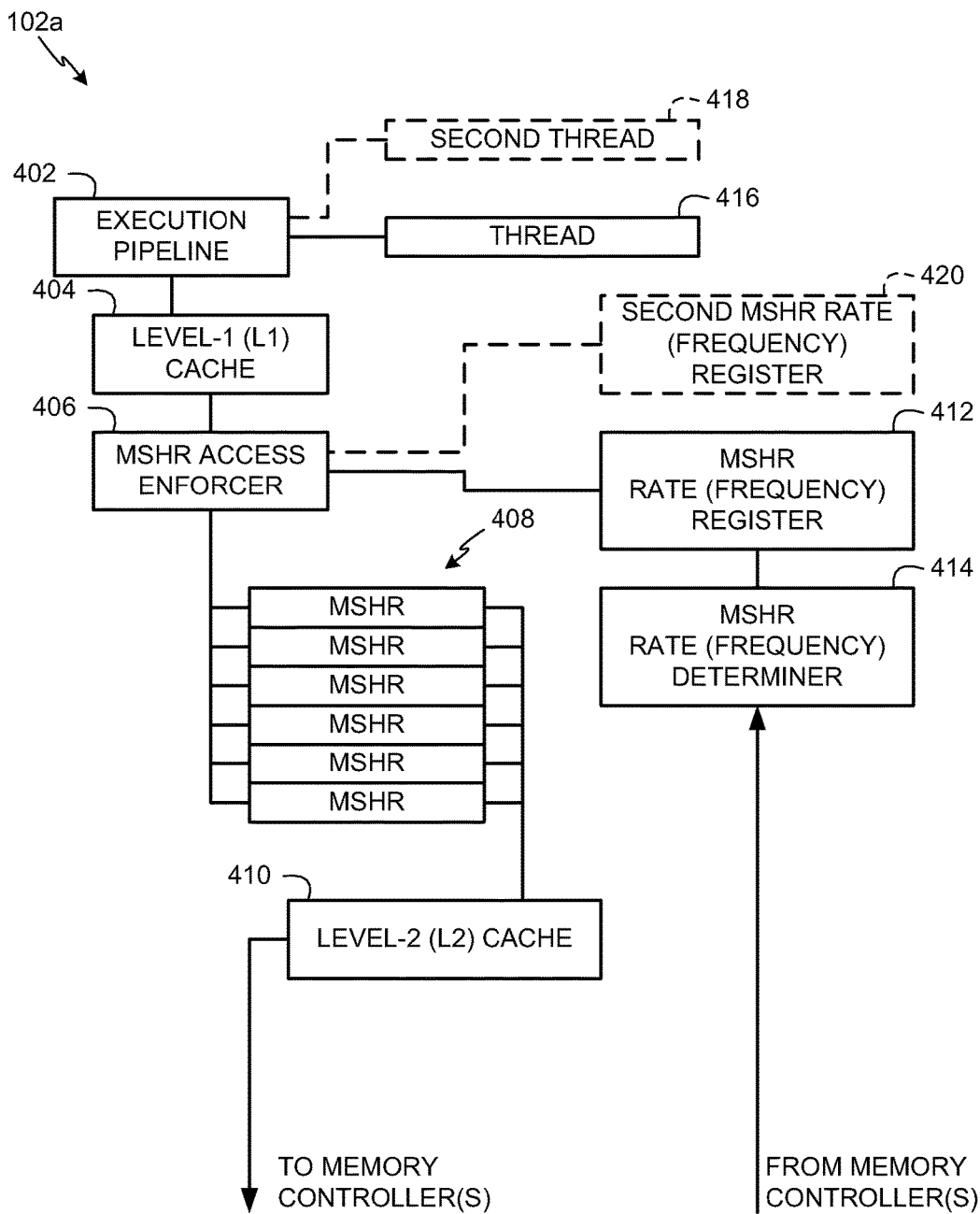
FIG. 4 illustrates another example implementation of an example processor to control generation of memory access requests based on multi-bit feedback messages from one or more memory controllers indicating amounts of memory access request congestion.

FIG. 4 illustrates an example manner of implementing an example processor (e.g., the processor 102a) of FIGS. 1 and 2 to control generation of memory access requests based on multi-bit feedback messages from one or more memory controllers (e.g., the memory controller(s) 104a-b) indicating amount(s) of memory access request congestion. Although in the interest of brevity and clarity only the CPU 102a is shown in detail in FIG. 4, each of the CPUs 102b-d (FIGS. 1 and 2) may be substantially similar or identical to the CPU 102a. In the illustrated example, the CPU 102a includes an execution pipeline 402, a level-1 cache 404, a miss status holding register (MSHR) access enforcer 406, an MSHR queue 408, a level-2 cache 410, a MSHR rate (frequency) register 412, and a MSHR rate (frequency) determiner 414.

In the illustrated example, the execution pipeline 402 is substantially similar or identical to the execution pipeline 302 of FIG. 3, the level-1 (L1) cache 404 is substantially similar or identical to the level-1 (L1) cache 304 of FIG. 3, the MSHR queue 408 is substantially similar or identical to the MSHR queue 308 of FIG. 3, and the level-2 (L2) cache 410 is substantially similar or identical to the level-2 (L2) cache 310 of FIG. 3. As such, the execution pipeline 402, the level-1 (L1) cache 404, the MSHR queue 408, and the level-2 (L2) cache 410 will not be described in detail again here. Instead the interested reader is referred to the above-description of FIG. 3 for a description of the operations of the execution pipeline 402, the level-1 (L1) cache 404, the MSHR queue 408, and the level-2 (L2) cache 410 by reference to the substantially similar operations of the execution pipeline 302, the level-1 (L1) cache 304, the MSHR queue 308, and the level-2 (L2) cache 310 described above. Although the core 102a of the illustrated example of FIG. 4 is shown in connection with the MSHR queue 408 being located between the level-1 (L1) cache 404 and the level-2 (L2) cache 410, examples disclosed herein may additionally or alternatively be implemented in connection with MSHR queues located after the level-2 (L2) cache 410 and/or in connection with separate MSHR queues located at multiple locations relative to the L1 and L2 caches (e.g., an MSHR queue located between the L1 and L2 caches 404 and 410 and after an MSHR queue located after the L2 cache 410).

In some instances, the rate or frequency at which memory access requests are generated by the thread (e.g., the thread 416) may cause congestion at the memory controller(s) 104a-b. To prevent, reduce, and/or eliminate congestion caused by the thread 416, the CPU 102a is provided with the MSHR access enforcer 406, the MSHR rate determiner 414, and the MSHR rate register 412. The MSHR rate determiner 414 of the illustrated example is to receive memory controller feedback (MCF) from the memory controller(s) 104a-b indicative of the quantity of memory access request congestion caused by the thread 416 in the memory controller(s) 104a-b. The memory controller feedback (MCF) is generated and sent by the memory controller(s) 104a-b in order to prevent, reduce, and/or eliminate memory access request congestion at one or more of the memory controllers 104a-b. When the thread (e.g., the thread 416) is not causing memory access request congestion at the memory controller(s) 104a-b, the memory controller feedback (MCF) may be used to increase the rate at which the thread (e.g., the thread 416) is allowed to generate memory access requests, thus improving (e.g., increasing) performance of the thread (e.g., the thread 416) and the CPU 102a.

In the illustrated example, the memory controller(s) 104a-b send(s) the memory controller feedback (MCF) in association with a memory reference (e.g., a memory reference identifier) used by the thread 416 to generate memory access requests. In some examples, the memory controller feedback received by the MSHR rate determiner 414 from the memory controller(s) 104a-b is in the form of multi-bit feedback that encodes a level or amount of memory access request congestion at the memory controller(s) 104a-b. In the illustrated example, the rate at which the thread 416 is allowed to generate memory access requests is referred to as an MSHR rate (R), which is representative of the rate at which the thread 416 is allowed to fill MSHR slots in the MSHR queue 408 with memory access requests. In this manner, defining the fill rate of MSHR slots in the MSHR queue 308 for memory access requests from the thread 416 defines the rate at which the thread 416 is allowed to generate memory access requests. In the illustrated example, the MSHR rate determiner 414 can determine the MSHR rate (R) using an MSHR rate function defined as $R_N=f(R_C, MCF)$, in which a new MSHR rate ($R_N$) is determined based on a current MSHR rate ($R_C$) and the memory controller feedback (MCF). The function (f) can be implemented using any suitable process. An example manner of implementing the function is shown below as Function 1.

—Function 1—

```
F(R_C, MCF) {
  if (MCF > 0)
  {
  /* i.e., the thread is causing memory controller congestion*/
  return R_N = (R_C × (1 − (MCF × C)))
  }
  else
  {
  /* i.e., MCF = 0, the thread is not causing memory controller
  congestion*/
  return R_N = (R_C + (1/ R_C))
  }}
```

In Function 1 above, if the memory controller feedback (MCF) is indicative of congestion (i.e., MCF>0) by the thread 416 at the memory controller 104a or 104b, then a new MSHR rate ($R_N$) is determined by subtracting one (1) from a product of the memory controller feedback (MCF) value (e.g., representative of the amount of congestion) and a constant (C) value (e.g., $R_N=(R_C\times(1-(MCF\times C)))$). In the illustrated example, the constant (C) is equal to the inverse of twice the maximum value of the memory controller feedback ($MCF_{MAX}$) (e.g., $C=1/(2\times MCF_{MAX})$). The maximum value of the memory controller feedback ($MCF_{MAX}$) of the illustrated example is the maximum amount or level of congestion that can be caused at the memory controller 104a or 104b by a thread (e.g., the thread 416). Also in Function 1 above, if the memory controller feedback (MCF) is not indicative of congestion (e.g., MCF=0) by the thread 416 at the memory controller 104a or 104b, then a new MSHR rate ($R_N$) is determined by adding a current MSHR rate ($R_C$) to the inverse of the current MSHR rate ($R_C$) (e.g., $R_N=R_C+(1/R_C)$).

In some examples, the equation, $R_N=(R_C\times(1-(MCF\times C)))$, may be replaced with an equation based on a lookup table (LT) (e.g., $R_N=(R_C\times LT[MCF])$). In such examples, the lookup table (LT) is indexed by the N-bit value of the MCF and returns a multiplier value. In some examples, the returned multiplier values (e.g., LT entry values) are less than 1.0 to reduce the rate R. Such examples allow non-linear response to the MCF. In some examples, the values in the LT entries are computed and stored by the operating system. In some examples, the LT values may be determined using the equation, $LT[MCF]=(1-MCF\times C)$, for each possible value of MCF. In other examples, the LT values are filled-in using some other formula(s), or with other values suitable for providing improved or acceptable performance.

In some examples, the LT-based equation, $R_N=(R_C\times LT[MCF])$, is performed on a per-thread basis, thereby allowing different feedback responses for different threads with higher or lower priorities. An example per-thread LT-based equation is $R_N=(R_C\times LT[ThreadID][MCF])$, in which a sub-table is maintained for each thread. In other examples, the LT-based equation, $R_N=(R_C\times LT[MCF])$, is instead performed on a per-thread-priority basis. An example per-thread-priority LT-based equation is $R_N=(R_C\times LT[ThreadPriority][MCF])$, in which a sub-table is maintained for each thread priority. In yet other examples, other formulas or techniques for determining the new MSHR rate ($R_N$) may be used in connection with Function 1 above.

After the MSHR rate determiner 414 determines the new MSHR rate ($R_N$), the MSHR rate determiner 414 stores the new MSHR quota ($R_N$) value in the MSHR rate register 412. The MSHR access enforcer 406 limits the thread 416 to filling the MSHR slots in the MSHR queue 408 with memory access requests at a rate that is equal to the MSHR rate (R) value stored in the MSHR rate register 412. In some instances, this may allow the thread 416 to increase a rate of memory access requests if the current MSHR rate (R) value stored in the MSHR rate register 412 is greater than the MSHR rate (R) value previously stored in the MSHR rate register 412. For instances in which the MSHR rate (R) value currently stored in the MSHR rate register 412 is less than the MSHR rate (R) value previously stored in the MSHR rate register 412, the thread 416 is caused to reduce the rate at which it generates memory access requests.

In some examples, the CPU 102a executes a second thread (e.g., the thread 418) or more threads. In the illustrated example, the CPU 102a is provided with a second MSHR rate register 420 to store a MSHR rate (R) value corresponding to the second thread 418. In this manner, the MSHR access enforcer 406 can limit the thread 418 to filling the MSHR slots in the MSHR queue 308 with memory access requests at a rate that is equal to the MSHR rate (R) value stored in the MSHR rate register 412. If the CPU 102a executes more than two threads simultaneously, the CPU 102a can be provided with a corresponding number of additional MSHR rate register(s) (that are similar or identical to the MSHR rate registers 412 and 420), one for each additional thread. In the illustrated example, to identify which MSHR rate register corresponds to which thread, each of the MSHR rate registers (e.g., the MSHR rate registers 412 and 420) is associated with a respective memory reference that is used by its respective thread (e.g., the threads 416 and 418) to generate memory access requests. In some examples, the MSHR quota registers (e.g., the MSHR quota registers 412 and 420) may additionally or alternatively be associated with a respective thread identifier (ID) of its respective thread (e.g., the threads 416 and 418).

In the illustrated example of FIG. 4, the MSHR rate register 412 and the second MSHR rate register 420 are configured so that they are not modifiable by their respective threads, but are instead only modifiable by the OS. In the illustrated example, when different software threads are multiplexed over a hardware thread (e.g., when different software threads are instantiated or started and others are ended), the OS stores the MSHR rate (R) value(s) in the MSHR rate register 412 and/or the second MSHR rate register 420 to memory (e.g., an SRAM buffer embedded in the core 102a) and stores MSHR rate (R) value(s) corresponding to the recently instantiated or started threads in the MSHR rate register 412 and/or the second MSHR rate register 420.

In the illustrated example of FIG. 4, while an example manner of implementing a CPU (e.g., the CPU 102a) has been illustrated, one or more of the elements, processes and/or devices illustrated in FIG. 4 may be combined, divided, re-arranged, omitted, eliminated and/or implemented in any other way. Further, the MSHR access enforcer 406, the MSHR rate register 412, the MSHR rate determiner 414, and/or the second MSHR rate register 420 may be implemented by hardware, software, firmware and/or any combination of hardware, software and/or firmware. Thus, for example, any of the MSHR access enforcer 406, the MSHR rate register 412, the MSHR rate determiner 414, and the second MSHR rate register 420, and/or, more generally, the example CPU 102a could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus and/or system claims are read to cover a purely software and/or firmware implementation, at least one of the MSHR access enforcer 406, the MSHR rate register 412, the MSHR rate determiner 414, and/or the second MSHR rate register 420 is hereby expressly defined to include a tangible computer readable medium such as a memory, DVD, CD, etc. storing the software and/or firmware. Further still, the example CPU 102a illustrated in FIG. 4 may include one or more elements, processes and/or devices in addition to, or instead of, those illustrated in FIG. 4, and/or may include more than one of any or all of the illustrated elements, processes and devices.

Figure 5:
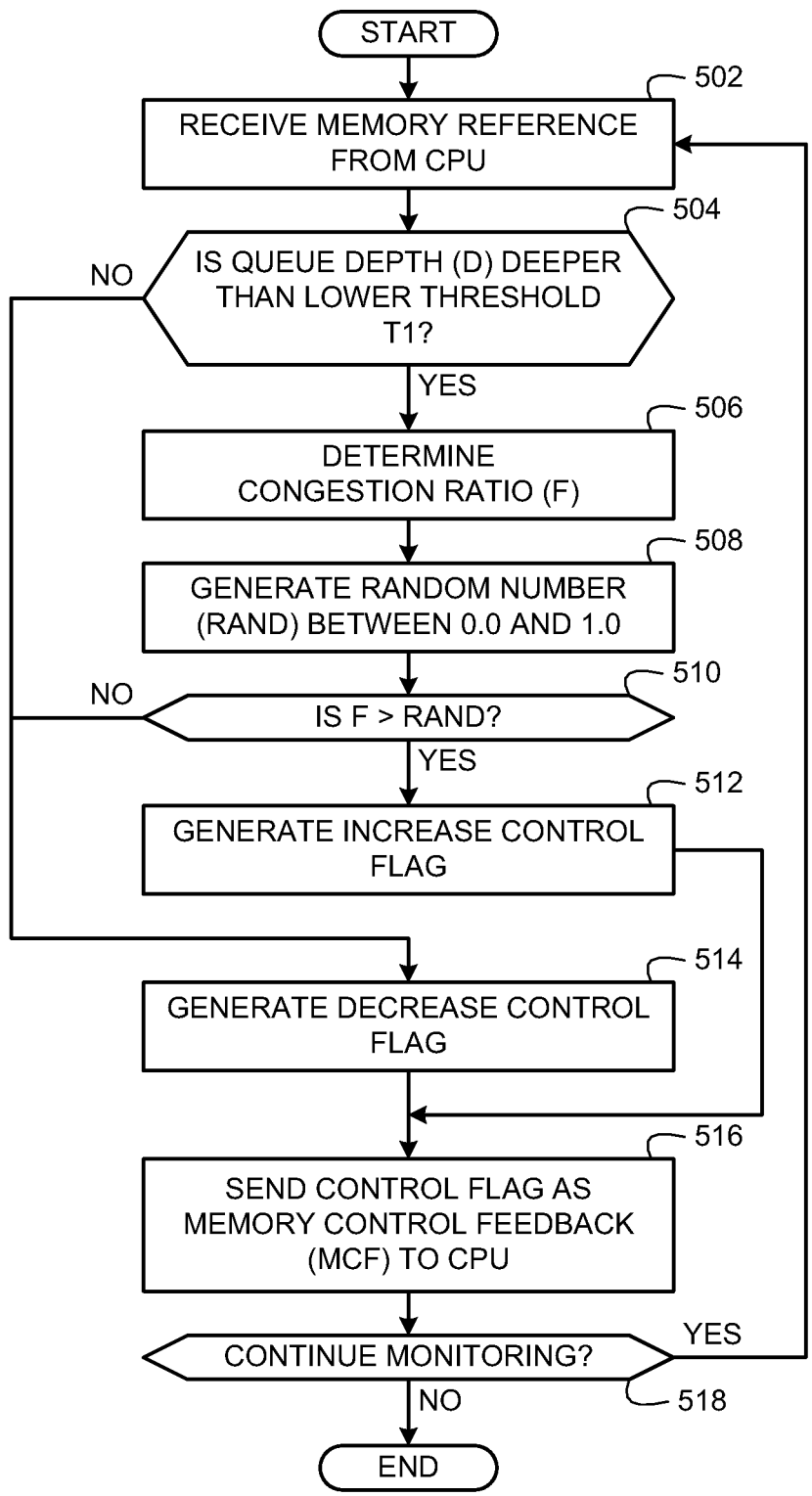
FIG. 5 is a flow diagram representative of example machine readable instructions that may be executed to implement an example memory controller to generate feedback messages indicating whether to increase or decrease a quantity of memory access requests.
Figure 6:
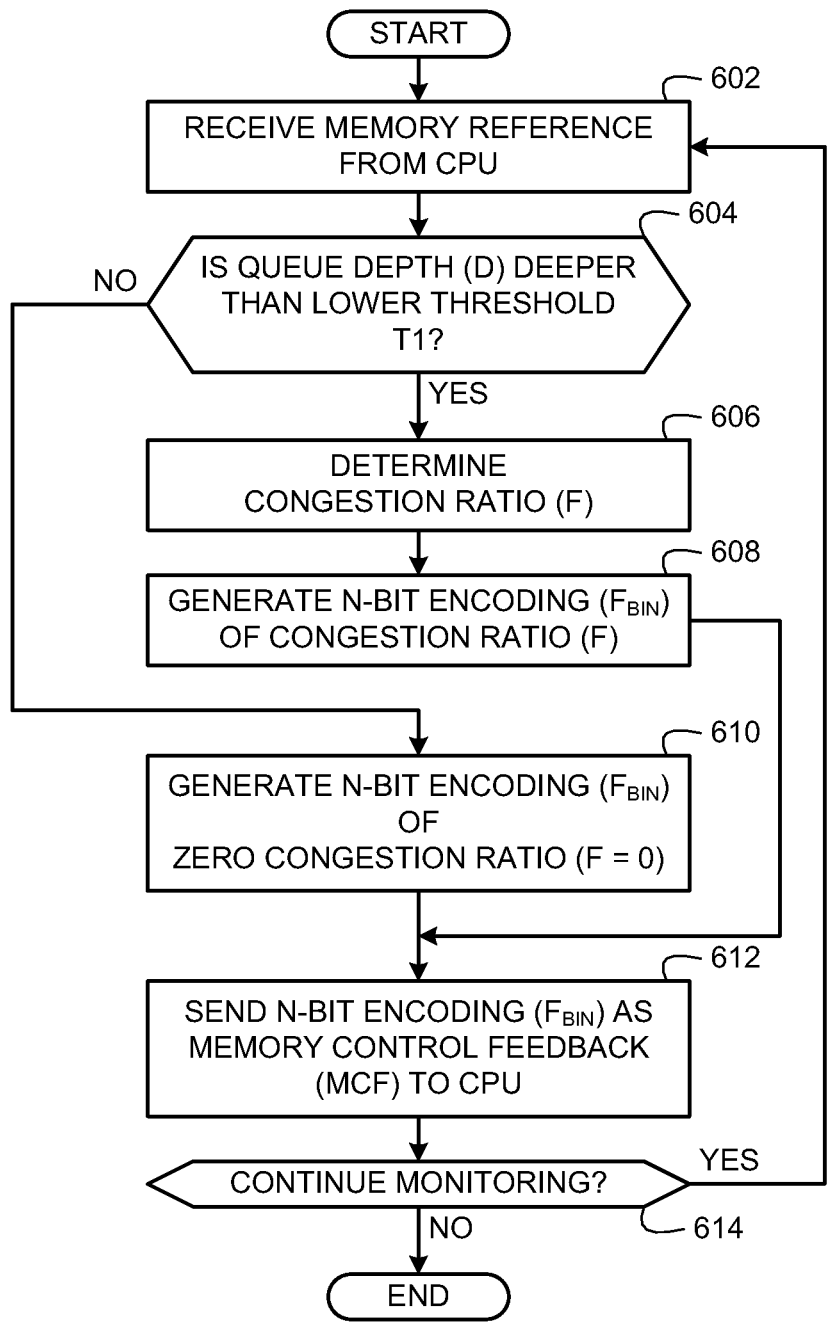
FIG. 6 is a flow diagram representative of example machine readable instructions that may be executed to implement an example memory controller to generate multi-bit feedback messages indicating amounts of memory access request congestion.
Figure 7:
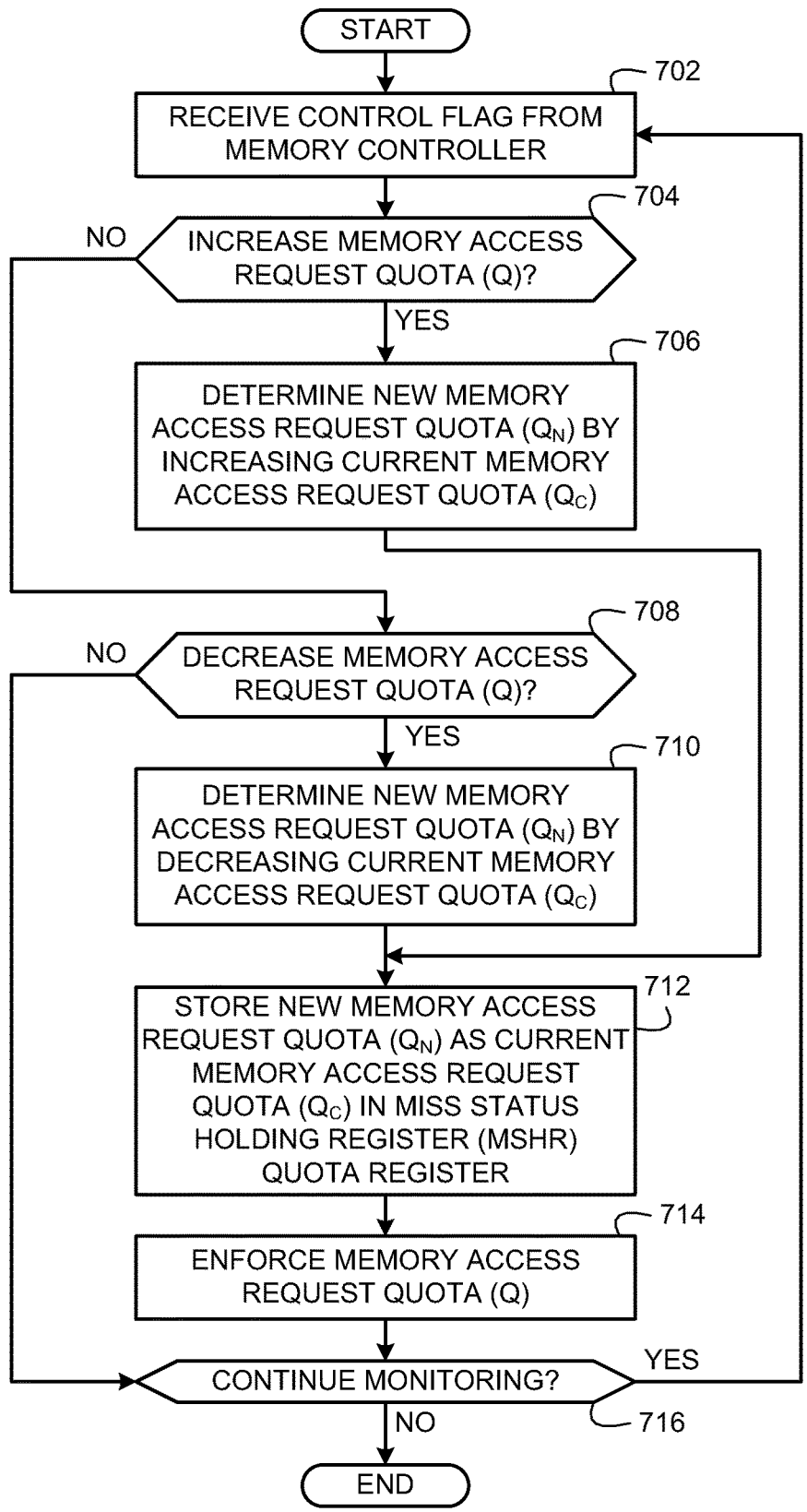
FIG. 7 is a flow diagram representative of example machine readable instructions that may be executed to implement an example apparatus to control generation of memory access requests based on feedback messages from one or more memory controllers indicating whether to increase or decrease a quantity of memory access requests.
Figure 8:
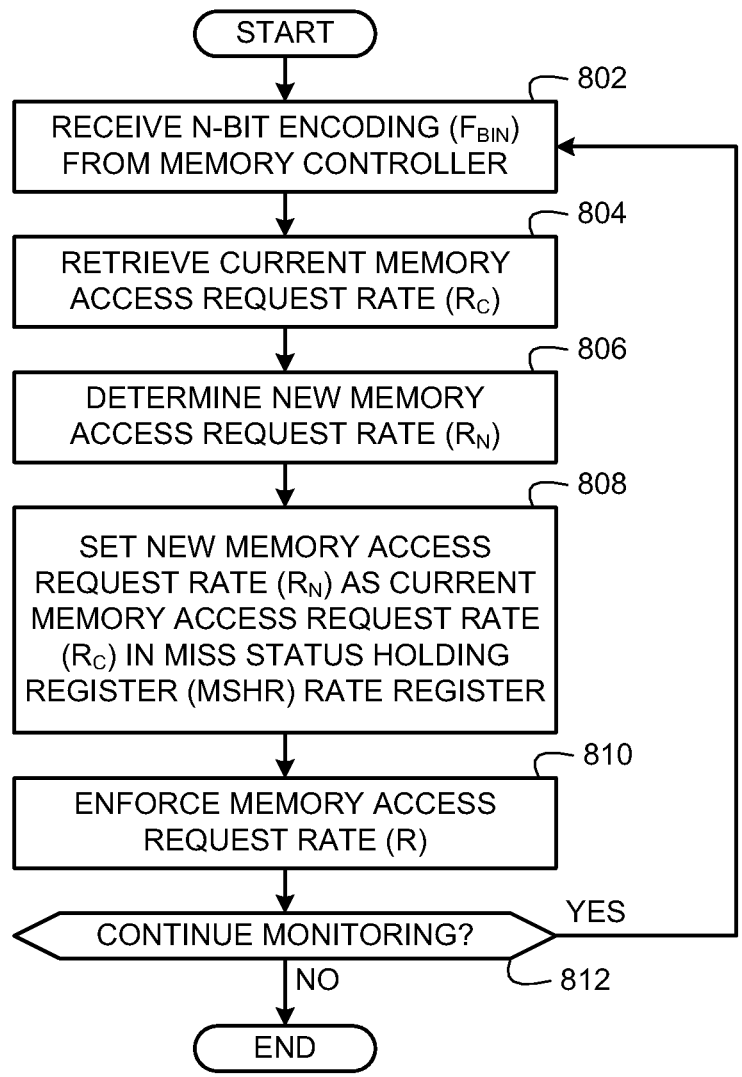
FIG. 8 is a flow diagram representative of example machine readable instructions that may be executed to implement an example apparatus to control generation of memory access requests based on multi-bit feedback messages from one or more memory controllers indicating amounts of memory access request congestion.

FIG. 5 is a flow diagram representative of example machine readable instructions that may be executed to implement a memory controller to generate feedback messages indicating whether to increase or decrease a quantity of memory access requests. FIG. 6 is a flow diagram representative of example machine readable instructions that may be executed to implement a memory controller to generate multi-bit feedback messages indicating amounts of memory access request congestion to facilitate control of generation of memory access requests. FIG. 7 is a flow diagram representative of example machine readable instructions that may be executed to implement example apparatus to control generation of memory access requests based on feedback messages from one or more memory controllers indicating whether to increase or decrease a quantity of memory access requests. FIG. 8 is a flow diagram representative of example machine readable instructions that may be executed to implement example apparatus to control generation of memory access requests based on multi-bit feedback messages from one or more memory controllers indicating amounts of memory access request congestion. For ease of discussion, the example processes of FIGS. 5-8 are described below in connection with the CPU 102a and the memory controller 104a of FIGS. 1 and 2. However, the example processes are similarly implemented using the other CPUs 102b-d and memory controller 104b of FIGS. 1 and 2.

The example processes of FIGS. 5-8 may be implemented using machine readable instructions that, when executed, cause a device (e.g., a programmable controller, processor (e.g., the multi-core processor 100 of FIG. 1), or other programmable machine or integrated circuit) to perform the operations shown in FIGS. 5-8. For instance, the example processes of FIGS. 5-8 may be performed using a processor, a controller, and/or any other suitable processing device. For example, the example processes of FIGS. 5-8 may be implemented using coded instructions stored on a tangible machine readable medium such as a flash memory, a read-only memory (ROM), and/or a random-access memory (RAM). As used herein, the term tangible computer readable medium is expressly defined to include any type of computer readable storage and to exclude propagating signals.

Additionally or alternatively, the example processes of FIGS. 5-8 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 5-8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 5-8 may be implemented as any combination(s) of any of the foregoing techniques, for example, any combination of firmware, software, discrete logic and/or hardware.

Although the example processes of FIGS. 5-8 are described with reference to the flow diagrams of FIGS. 5-8, other methods of implementing the processes of FIGS. 5-8 may be employed. For example, the order of execution of the blocks may be changed, and/or some of the blocks described may be changed, eliminated, sub-divided, or combined. Additionally, one or both of the example processes of FIGS. 5-8 may be performed sequentially and/or in parallel by, for example, separate processing threads, processors, devices, discrete logic, circuits, etc.

Turning to FIG. 5, the example process may be performed at a memory controller (e.g., the memory controller 104a of FIGS. 1 and 2) and used to generate memory controller feedback (MCF) messages indicating whether to increase or decrease a quantity of memory access requests generated by a thread (e.g., the thread 316 of FIG. 3). Initially, the access arbiter 202 receives a memory reference from the CPU 102a (block 502). For example, the memory reference may be received by the access arbiter 202 in a memory access request from the CPU 102a. The access arbiter 202 determines whether the queue depth (D) is deeper than a lower threshold (T1) (block 504). In the illustrated example, the access arbiter 202 retrieves the queue depth (D) for the thread 316 (FIG. 3) from the queue depth register 206 (FIG. 2). If the queue depth (D) is deeper than the lower threshold (T1) (block 504), the access arbiter 202 determines the congestion ratio (F) (block 506) using, for example, Equation 1 above.

The access arbiter 202 determines a random or pseudo-random number (RAND) between 0.0 and 1.0 (block 508). For example, the access arbiter 202 may use a random number generator or pseudo-random number generator. In the illustrated example, the access arbiter 202 employs the random number (RAND) to allocate memory access resource usage to threads in a random or pseudo-random manner. Such randomness enables evenly distributing memory access resources of the memory controller 104a among multiple threads in one or more of the CPUs 102a-d over time. In some examples, the ratio (F) and the random or pseudo-random number (RAND) are represented in hardware as scaled integers (e.g., in the range $0 \ldots 2^M$ for some value of M) rather than as floating-point numbers. The access arbiter 202 determines whether the congestion ratio (F) is greater than the random number (RAND) (block 510). If the congestion ratio (F) is greater than the random number (RAND), the access arbiter 202 generates an increase control flag (block 512). In the illustrated example, the memory controller 104a uses the increase control flag as memory controller feedback (MCF) to the CPU 102a to indicate that the thread 316 is allowed to increase a quantity of memory access requests that can be pending at any given time. In some examples, the congestion ratio (F) and the random number (RAND) are both scaled by the same factor so that their comparison and other operations can be performed using integer arithmetic. For example, the random number (RAND) could be scaled to be between 1 and 128, and the congestion ratio (F) could be scaled to be between 0 and 128. Such scaling may facilitate implementing comparisons and other operations associated with the random number (RAND) and the congestion ratio (F) in hardware (e.g., logic circuits).

If the access arbiter 202 determines at block 510 that the congestion ratio (F) is not greater than the random number (RAND) or determines at block 504 that the queue depth (D) is not deeper than the lower threshold (T1), control advances to block 514, and the access arbiter 202 generates a decrease control flag (block 514). In the illustrated example, the memory controller 104a uses the decrease control flag as memory controller feedback (MCF) to the CPU 102a to indicate that the thread 316 is allowed to decrease a quantity of memory access requests that can be pending at any given time.

After generating the increase control flag at block 512 or the decrease control flag at block 514, the access arbiter 202 sends the control flag as memory control feedback (MCF) to the CPU 102a (block 516). In the illustrated example, the CPU 102a may use the memory control feedback (MCF) to control generation of memory access requests by the thread 316 as described below in connection with the example process of FIG. 7.

The access arbiter 202 determines whether it should continue to monitor for memory access requests (block 518). If the access arbiter 202 should continue to monitor for memory access requests (e.g., the memory controller 104a remains powered and in an active mode), control returns to block 502. Otherwise (e.g., the memory controller 104a is powered down or is in a low-power stand-by or sleep mode), the example process of FIG. 5 ends.

FIG. 6 is another example process that may be performed at a memory controller (e.g., the memory controller 104a of FIGS. 1 and 2) and used to generate memory controller feedback (MCF) messages indicating amounts or levels of memory access request congestion caused by a thread (e.g., the thread 416 of FIG. 4). Initially, the access arbiter 202 receives a memory reference from the CPU 102a (block 602). For example, the memory reference may be received by the access arbiter 202 in a memory access request from the CPU 102a. The access arbiter 202 determines whether the queue depth (D) is deeper than a lower threshold (T1) (block 604). In the illustrated example, the access arbiter 202 retrieves the queue depth (D) for the thread 416 (FIG. 4) from the queue depth register 206 (FIG. 2). If the queue depth (D) is deeper than the lower threshold (T1) (block 604), the access arbiter 202 determines the congestion ratio (F) (block 606) using, for example, Equation 1 above. In some examples, the ratio (F) is represented in hardware as a scaled integer (e.g., in the range $0 \ldots 2^M$ for some value of M) rather than as a floating-point number. The access arbiter 202 generates an N-bit encoding ($F_{BIN}$) of the congestion ratio (F) (block 608). In the illustrated example, the N-bit encoding ($F_{BIN}$) is representative of an amount or level of congestion caused by the thread 412 at the memory controller 104a.

If the queue depth (D) is not deeper than the lower threshold (T1) (block 604), the access arbiter 202 generates an N-bit encoding ($F_{BIN}$) of zero congestion (F=0) (block 610). After generating the N-bit encoding ($F_{BIN}$) at block 608 or block 610, the access arbiter 202 sends the N-bit encoding ($F_{BIN}$) as memory control feedback (MCF) to the CPU 102a (block 612). In the illustrated example, the CPU 102a may use the memory control feedback (MCF) to control generation of memory access requests by the thread 412 as described below in connection with the example process of FIG. 8.

The access arbiter 202 determines whether it should continue to monitor for memory access requests (block 614). If the access arbiter 202 should continue to monitor for memory access requests (e.g., the memory controller 104a remains powered and in an active mode), control returns to block 602. Otherwise (e.g., the memory controller 104a is powered down or is in a low-power stand-by or sleep mode), the example process of FIG. 6 ends.

FIG. 7 is an example process that may be used to control generation of memory access requests by the thread 316 (FIG. 3) based on memory controller feedback (MCF) received from the memory controller 104a indicating whether to increase or decrease a quantity of memory access requests. By way of example, the example process of FIG. 7 is described in connection with the CPU 102a configuration as shown in FIG. 3.

Initially, the MSHR quota determiner 314 (FIG. 3) receives a control flag from the memory controller 104a (block 702). In the illustrated example, the MSHR quota determiner 314 receives the memory controller feedback (MCF) sent by the memory controller 104a at block 516 of FIG. 5 and extracts the control flag therefrom. The MSHR quota determiner 314 determines whether to increase a memory access request quota (Q) (block 704). In some examples, the MSHR quota determiner 314 determines that it should increase a memory access request quota (Q) (e.g., the current MSHR quota ($Q_C$) stored in the MSHR quota register 312 of FIG. 3) if the control flag received at block 702 indicates that the core 102a is allowed to increase the quantity of allowable memory access requests in the MSHR queue 308 (FIG. 3). In other examples, the MSHR quota determiner 314 determines that it should increase the current MSHR quota ($Q_C$) whenever a memory access request is completed.

If the MSHR quota determiner 314 determines at block 704 that it should increase the memory access request quota (Q), the MSHR quota determiner 314 determines a new memory access request quota ($Q_N$) by increasing the current memory access request quota ($Q_C$) (block 706). In some examples, the MSHR quota determiner 314 determines the new memory access request quota (e.g., a new MSHR quota ($Q_N$)) using Equation 2 above by setting the new memory access request quota ($Q_N$) equal to the sum of a current memory access request quota (e.g., a current MSHR quota ($Q_C$)) and the inverse of the current memory access request quota ($Q_C$) (e.g., $Q_N=Q_C+(1/Q_C)$). Alternatively, as discussed above in connection with Equation 2, other manners of increasing the current MSHR quota ($Q_C$) may be used.

If the MSHR quota determiner 314 determines at block 704 that it should not increase the memory access request quota (Q), the MSHR quota determiner 314 determines whether it should decrease the memory access request quota (Q) (block 708). In some examples, the MSHR quota determiner 314 determines that it should decrease a memory access request quota (Q) (e.g., the current MSHR quota ($Q_C$) stored in the MSHR quota register 312 of FIG. 3) if the control flag received at block 702 indicates that the core 102a should decrease the quantity of allowable memory access requests in the MSHR queue 308 (FIG. 3). If the MSHR quota determiner 314 determines at block 708 that it should not decrease the memory access request quota (Q), control advances to block 716. Otherwise, if the MSHR quota determiner 314 determines at block 708 that it should decrease the memory access request quota (Q), the MSHR quota determiner 314 determines the new memory access request quota ($Q_N$) by decreasing the current memory access request quota ($Q_C$) (block 710). In some examples, the MSHR quota determiner 314 determines the new memory access request quota ($Q_N$) (e.g., a new MSHR quota ($Q_N$)) using Equation 3 above by setting the new memory access request quota ($Q_N$) equal to the current memory access request quota ($Q_C$) (e.g., a current MSHR quota ($Q_C$)) divided by two (2) (e.g., $Q_N=Q_C/2$). Alternatively, as discussed above in connection with Equation 3, other manners of decreasing the current MSHR quota ($Q_C$) may be used.

After determining a new memory access request quota ($Q_N$) at block 706 or at block 710, the MSHR quota determiner 314 stores the new memory access request quota ($Q_N$) as the current memory access request quota ($Q_C$) in the MSHR quota register 312 (block 712). The MSHR access enforcer 306 (FIG. 3) enforces the memory access request quota (Q) stored in the MSHR quota register 312 (block 714) by limiting the thread 316 to generating a quantity of memory access requests pending at any given time to a value equal to the memory access request quota (Q) (e.g., the current memory access request quota ($Q_C$) stored in the MSHR quota register 312).

The MSHR quota determiner 314 determines whether it should continue to monitor for memory controller feedback (MCF) (block 716). If the MSHR quota determiner 314 should continue to monitor for memory controller feedback (MCF) (e.g., the CPU 102a remains powered and active), control returns to block 702. Otherwise (e.g., the CPU 102a is powered down or is in a low-power, stand-by or sleep mode), the example process of FIG. 7 ends.

FIG. 8 illustrates an example process that may be used to control generation of memory access requests by the thread 416 (FIG. 4) based on memory controller feedback (MCF) received from the memory controller 104a and indicating whether to increase or decrease a rate at which thread 416 generates memory access requests. For purposes of illustration, the example process of FIG. 8 is described in connection with the CPU 102a configuration as shown in FIG. 4.

Initially, the MSHR rate determiner 414 (FIG. 4) receives an N-bit congestion ratio encoding ($F_{BIN}$) from the memory controller 104a (block 802). In the illustrated example, the MSHR rate determiner 414 receives the memory controller feedback (MCF) sent by the memory controller 104a at block 612 of FIG. 6 and extracts the N-bit congestion ratio encoding ($F_{BIN}$) therefrom. The MSHR rate determiner 414 retrieves a current memory access request rate ($R_C$) from the MSHR rate register 412 (FIG. 4) (block 804). The MSHR rate determiner 414 determines a new memory access request rate ($R_N$) (block 806) based on, for example, Function 1 described above.

The MSHR rate determiner 414 sets the new memory access request rate ($R_N$) as the current memory access request rate ($R_C$) in the MSHR rate register 412 (FIG. 4) (block 808). The MSHR access enforcer 406 (FIG. 4) enforces the memory access request rate (R) stored in the MSHR rate register 412 (block 810) by limiting the thread 416 to generating memory access requests at a rate equal to the memory access request rate (R).

The MSHR rate determiner 414 determines whether it should continue to monitor for memory controller feedback (MCF) (block 812). If the MSHR rate determiner 414 should continue to monitor for memory controller feedback (MCF) (e.g., the CPU 102a remains powered and active), control returns to block 802. Otherwise (e.g., the CPU 102a is powered down or is in a low-power stand-by or sleep mode), the example process of FIG. 8 ends.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to control generation of memory access requests, the method comprising:
determining at a memory controller whether a miss status holding register (MSHR) queue depth for a memory reference is greater than a first threshold, wherein the queue depth indicates an amount of memory access request congestion at the memory controller, wherein the memory reference is associated with a particular thread, and the request congestion is determined as a congestion ratio (F) based on a first threshold (T1), a second threshold (T2), and the MSHR queue depth (D) of a MSHR queue expressed as $F=(D-T1)/(T2-T1)$; and
when the MSHR queue depth for the memory reference is greater than the first threshold, sending an indication to control generation of memory access requests corresponding to the memory reference, wherein the indication is a first value that represents a ratio of a difference between the MSHR queue depth and the first threshold, wherein the first value is a multi-bit value indicative of an amount of memory access request congestion at the memory controller for the memory reference, and wherein the first value is compared to a second value to initiate a change in a quantity of memory based on the comparison.

2. A method as defined in claim 1, further comprising determining a single-bit value for the indication by:
determining the ratio based on the first threshold, a second threshold, and the queue depth; and
wherein the second value is a pseudo-random or random number.

3. A method as defined in claim 2, wherein the single-bit value is indicative of an allowance to increase a quantity of memory access requests for the memory reference when the ratio is greater than the random number, and the single-bit value is indicative of a request to decrease the quantity of memory access requests for the memory reference when the ratio is not greater than the pseudo-random or random number.

4. A method as defined in claim 1, further comprising determining the multi-bit value by:
determining the ratio based on the first threshold, a second threshold, and the queue depth; and
bit-encoding the ratio.

5. A method as defined in claim 1, wherein the memory reference is of a first processor, and further comprising tracking a second MSHR queue depth at the memory controller for a second memory reference of a second processor, and further comprising sending the second processor a second indication to control generation of memory access requests corresponding to the second memory reference.

6. An apparatus to control generation of memory access requests, the apparatus comprising:
a miss status holding register (MSHR) in a processor to store a first value to control memory access requests to be generated by a thread, wherein the control memory access includes a queue depth that indicates an amount of memory access request congestion at the memory controller; and
a MSHR access enforcer coupled to the MSHR in the processor to control generation of the memory access requests based on the first value stored in the register, wherein the value is a first value that represents a ratio of a difference between a MSHR queue depth and a first threshold, wherein the first value is a multi-bit value indicative of an amount of memory access request congestion at the memory controller for the memory reference, wherein the first value is compared to a second value to initiate a change in a quantity of memory based on the comparison.

7. An apparatus as defined in claim 6, wherein the value is a quota value indicative of a quantity of pending memory access requests to be maintained by the processor for the thread.

8. An apparatus as defined in claim 7, further comprising a quota determiner to generate the quota value based on a feedback signal from a memory controller and a current quota value, the feedback signal being indicative of an allowance to increase the quota value or a request to decrease the quota value.

9. An apparatus as defined in claim 6, wherein the value is a rate value indicative of a rate at which the thread is allowed to generate memory access requests.

10. An apparatus as defined in claim 9, further comprising a rate determiner to generate the rate value based on a feedback signal from the memory controller and a current rate value, the feedback signal indicative of an amount of memory access request congestion at a memory controller for the thread.

11. An apparatus as defined in claim 6, wherein the enforcer is to control the generation of the memory access requests by controlling access to one or more miss status holding registers in the processor.

12. An apparatus as defined in claim 6, further comprising a second register in the processor to store a second value to control second memory access requests to be generated by a second thread, the enforcer to control generation of the second memory access requests based on the second value stored in the second register.

13. A tangible machine accessible medium having instructions stored thereon that, when executed, cause a machine to at least:
determining whether a miss status holding register (MSHR) queue depth at a memory controller for a memory reference is greater than a first threshold, wherein the queue depth indicates an amount of memory access request congestion at the memory controller, wherein the memory reference is associated with a particular thread, and the request congestion is determined as a congestion ratio (F) based on a first threshold (T1), a second threshold (T2), and the MSHR queue depth (D) of a MSHR queue expressed as $F=(D-T1)/(T2-T1)$; and
when the MSHR queue depth for the memory reference is greater than the first threshold, send an indication to control generation of memory access requests corresponding to the memory reference, wherein the indication is a first value that represents a ratio of a difference between the MSHR queue depth and the first threshold, and wherein the first value is a multi-bit value indicative of an amount of memory access request congestion at the memory controller for the memory reference, wherein the first value is compared to a second value to initiate a change in a quantity of memory based on the comparison.

14. A machine accessible medium as defined in claim 13 having instructions stored thereon that, when executed, cause the machine to determine the indication by:
 determining a ratio based on the first threshold, a second threshold, and the queue depth; and
 comparing the ratio to a pseudo-random or random number.

15. A machine accessible medium as defined in claim 14, wherein the indication is indicative of an allowance to increase a quantity of memory access requests for the memory reference when the ratio is greater than the pseudo-random or random number, and the single-bit value being indicative of a request to decrease the quantity of memory access requests for the memory reference when the ratio is not greater than the pseudo-random or random number.

16. The method of claim 13, having instructions stored thereon that, when executed, cause the machine to determine the multi-bit value by: determining a ratio based on the first threshold, a second threshold, and the queue depth; and bit-encoding the ratio.

17. A machine accessible medium as defined in claim 13, wherein the memory reference is of a first processor, and the machine accessible medium having instructions stored thereon that, when executed, cause the machine to cause the memory controller to track a second MSHR queue depth for a second memory reference of a second processor, and to send the second processor a second indication to control generation of memory access requests corresponding to the second memory reference.

\* \* \* \* \*